United States Patent
Price

(10) Patent No.: US 10,710,700 B2
(45) Date of Patent: Jul. 14, 2020

(54) AIRFRAME FOR AN AIR VEHICLE

(71) Applicant: BAE SYSTEMS plc, London (GB)

(72) Inventor: Howard James Price, Preston (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 15/772,376

(22) PCT Filed: Nov. 8, 2016

(86) PCT No.: PCT/GB2016/053486
§ 371 (c)(1),
(2) Date: Apr. 30, 2018

(87) PCT Pub. No.: WO2017/081450
PCT Pub. Date: May 18, 2017

(65) Prior Publication Data
US 2018/0327072 A1    Nov. 15, 2018

(30) Foreign Application Priority Data

Nov. 13, 2015  (GB) .................................. 1520030.6
Nov. 27, 2015  (EP) ..................................... 15196707

(51) Int. Cl.
*B64C 1/12*    (2006.01)
*B64C 1/06*    (2006.01)

(52) U.S. Cl.
CPC ............. *B64C 1/12* (2013.01); *B64C 1/061* (2013.01); *B64C 1/066* (2013.01); *B64C 1/069* (2013.01)

(58) Field of Classification Search
CPC ............ B64C 1/069; B64C 1/12; B64C 1/066
See application file for complete search history.

(56) References Cited

U.S. PATENT DOCUMENTS

| | | | |
|---|---|---|---|
| 3,934,845 A | 1/1976 | Rosin | |
| 2008/0217470 A1* | 9/2008 | Zhao | A63H 27/02 244/99.3 |
| 2011/0265300 A1 | 11/2011 | Bense et al. | |
| 2013/0020438 A1 | 1/2013 | Glynn et al. | |

FOREIGN PATENT DOCUMENTS

| | | |
|---|---|---|
| CN | 101811575 A1 | 8/2010 |
| DE | 102008023194 A1 | 12/2009 |
| JP | H04328808 A | 11/1992 |

OTHER PUBLICATIONS

International Preliminary Report on Patentability for International Application No. PCT/GB2016/053486, dated May 15, 2018, 7 pages.
European Search Report for Appl 15196707.2 dated Feb. 9, 2016, 8 pages.
Great Britain Search Report for Appl GB1520030.6 dated May 12, 2016, 3 pages.
Great Britain Search and Examination Report for Appl GB1618791.6 dated Apr. 7, 2017, 4 pages.
PCT Search Report for Appl PCT/GB2016/053486 dated Nov. 30, 2016, 11 pages.
The Skyline Spaceplane: Progress to Realisation, Richard Varvill and Alan Bond, Reaction Engines Ltd, Culham Science Centre, JBIS, vol. 61, pp. 412-418, 2008.

* cited by examiner

*Primary Examiner* — Jessica B Wong
(74) *Attorney, Agent, or Firm* — Maine Cernota & Rardin

(57) ABSTRACT

An airframe (10) for an air vehicle comprising an outer skin layer (12) and a support layer (13) defining a fuselage of said air vehicle, wherein said outer skin layer (12) is magnetically coupled to said support layer (13).

12 Claims, 1 Drawing Sheet

AIRFRAME FOR AN AIR VEHICLE

RELATED APPLICATIONS

Figure 1:
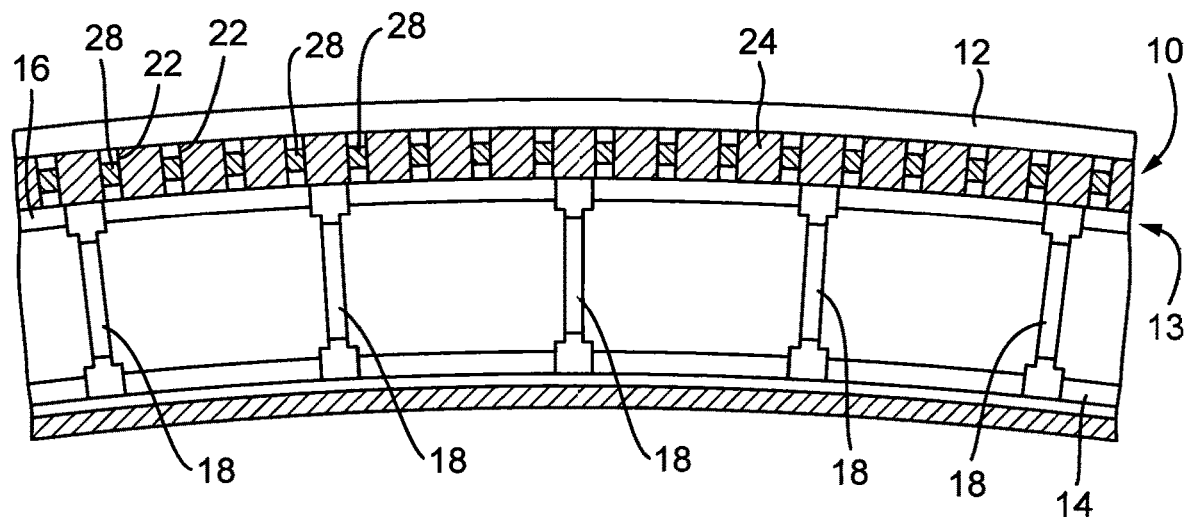

This application is a national phase application filed under 35 USC § 371 of PCT Application No. PCT/GB2016/053486 with an International filing date of 8 Nov. 2016 which claims priority of GB Patent Application 1520030.6 filed 13 Nov. 2015 and EP Patent Application 15196707.2 filed 27 Nov. 2015. Each of these applications is herein incorporated by reference in its entirety for all purposes.

This invention relates generally to an airframe for an air vehicle, and a method of manufacturing same, and more particularly but not necessarily exclusively to an airframe, and method of manufacturing same, suitable for use in high speed aircraft and aerospace applications.

In the field of aircraft and aerospace vehicle design, significant ongoing research and development goes into the design of the airframe to ensure that it can adequately support the aerodynamic forces generated during a flight.

Traditionally, a monocoque approach has been adopted for this purpose, whereby the chassis is integral with the body and aerodynamic forces or loads are supported through the external skin of the air vehicle.

Another known approach, termed semi-monocoque, provides a structure having components that are monocoques, but which form part of a composite frame structure.

A third design approach, used, for example, in the Zeppelin airship, employs a support layer in the form of a frame structure between the outer shell and a main body, wherein the frame structure forms the main load bearing structure. In this case, the support layer is mounted between the outer shell and the main body by bolting or otherwise permanently affixing (by adhesive, for example) one end of each of the frame support members or struts (on one side of the support layer) to the inner surface of the outer shell, and bolting or otherwise permanently affixing the opposing ends of the struts (on the other side of the support layer) to the outer surface of the main body (or a layer provided thereon).

The outer shell of an aircraft is generally termed its skin, whereas in an aerospace vehicle it is commonly known as an aeroshell. In both cases, the outer shell is designed to shield the internal air vehicle structure from the aerodynamic forces generated during a flight, and in aerospace applications, the aeroshell is additionally required to act as a thermal barrier to shield the internal structure from the intense heat associated with atmospheric re-entry or very high speed atmospheric flight. Whilst the above-described frame structure for use in aircraft design may have considerable advantages, including a potential reduction in the overall weight of the air vehicle, it is thought that the service life of the air vehicle may be adversely affected within such a design due, at least in part, to the limited longevity of both the outer shell and the means of attaching the shell to the frame structure. Additionally, due to the nature and complexity of the attachment means, large-scale dismantling of the outer shell from the airframe (for servicing, repair or replacement) may become difficult or even virtually impossible.

It would, therefore, be desirable to provide an airframe design that enables the use of a support structure between the outer shell and the main air vehicle body, whilst further facilitating large-scale dismantling of the outer shell from the airframe for servicing, repair or replacement, thereby potentially enabling a relatively lightweight, efficient airframe design that could additionally increase the service life of an air vehicle.

It is an object of aspects of the present invention to address at least some of these issues and, in accordance with a first aspect of the present invention, there is provided an airframe for an air vehicle comprising an outer skin layer and a support layer defining a fuselage of said air vehicle, wherein said outer skin layer is magnetically coupled to said support layer.

In an exemplary embodiment, the support layer may comprise a frame structure comprising a plurality of interconnected frame members defining an inner frame, an outer frame and a plurality of struts, each extending between said inner frame and said outer frame. The support layer may comprise a truss structure including a plurality of truss formations, each truss formation comprising a pair of struts coupled together at one end to form an apex and extending between said inner frame and said outer frame. Each said truss formation may be arranged and configured such that said apex is directed toward an inner surface of said outer skin layer.

In a first exemplary embodiment of the invention, the outer skin layer is formed of, incorporates, or has embedded therein, a magnetically susceptible material in the form of ferromagnetic or permanently magnetic material. For example, a sufficient proportion of magnetically susceptible particles (e.g. iron, or martensitic, or delta-ferrite type stainless steel, or cobalt, or any other recognized ferromagnetic material) could be incorporated/embedded (e.g. in the form of a distributed particulate array) in the outer skin layer to render it sufficiently ferromagnetic, which would have the additional benefit (potentially) of making the outer skin layer radiation absorbent. The outer skin layer could even be substantially formed of a magnetically susceptible material such as those mentioned above. In an alternative exemplary embodiment, one or more sections of magnetic material may be provided in or on said outer skin layer. Optionally, one or more portions of ferromagnetic material may be provided in or on said outer skin layer, in the form of ferromagnetic or permanently magnetic material. In one exemplary embodiment, an array of ferromagnetic sheet material inserts may be embedded in or otherwise provided in or on said outer skin layer. The outer skin layer may incorporate, or be coated with, a radar-absorbent material.

In an exemplary embodiment of the invention, one or more magnetic components may be provided in or on said support layer. Such one or more magnetic components may comprise electromagnets. The electromagnets may comprise superconducting windings. Optionally, the airframe may further comprise means for supplying power to said one or more electromagnets to generate an attracting force relative to said magnetic components in or on said outer skin layer so as to couple said outer skin layer to said support layer. Indeed, the airframe may further comprise means for selectively reversing said power supplied to said one or more electromagnets so as to release said outer skin layer from said support layer. The airframe may further comprise means for selectively varying the power supplied to said one or more electromagnets so as to vary the magnetic force generated thereby.

In an exemplary embodiment, the support layer may comprise a plurality of support members on an outer surface thereof, for supporting said outer skin layer, and wherein a magnetic component is provided in or on at least some of said support members. The airframe may, optionally, further comprise an insulative layer (which could include the presence of an air gap) located between said support layer and said outer skin layer, into which said support members extend.

In accordance with another aspect of the present invention, there is provided an air vehicle including an airframe substantially as described above.

In accordance with yet another aspect of the present invention, there is provided a method of manufacturing an airframe for an air vehicle, the method comprising the steps of providing a support layer defining a fuselage of said air vehicle and including magnetic means therein, providing an outer skin layer including magnetic means, and magnetically coupling said outer skin layer over a surface of said support layer.

Figure 2:
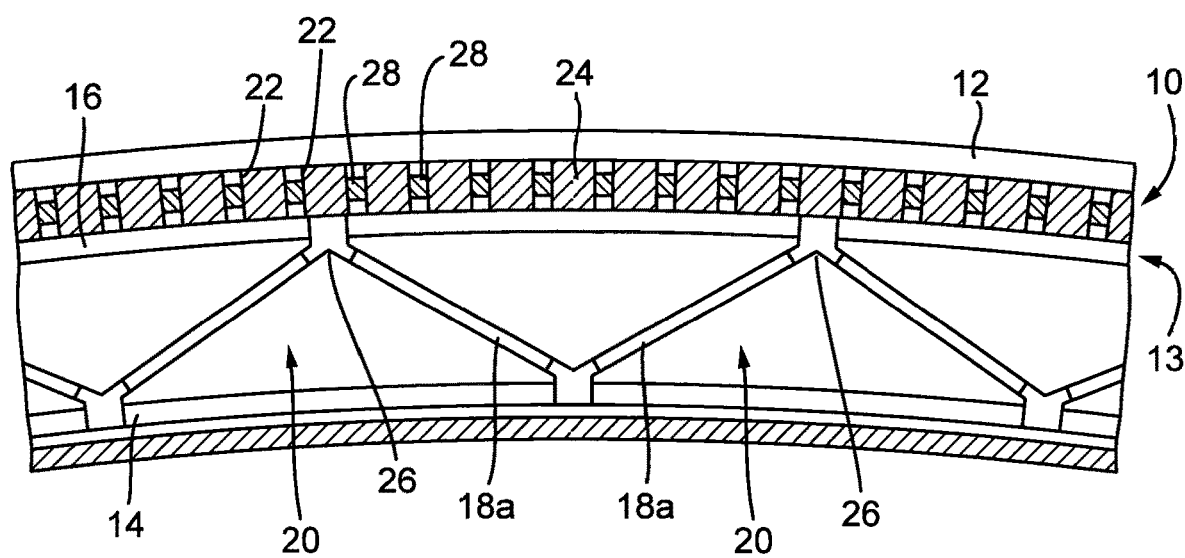

These and other aspects of the present invention will be apparent from the following specific description, in which embodiments of the present invention are described, by way of examples only, and with reference to the accompanying drawings, in which:

FIG. 1 is a schematic cross-sectional partial view of an airframe according to a first exemplary embodiment of the present invention; and FIG. 2 is a schematic cross-sectional partial view of an airframe according to a second exemplary embodiment of the present invention.

Referring to FIGS. 1 and 2 of the drawings, an airframe 10 according to an exemplary embodiment of the present invention comprises an outer skin layer 12 and a support layer 13. The support layer 13 comprises an inner frame 14 and an outer frame 16 arranged in spaced apart and substantially parallel relation, wherein the profile of the inner and outer frames 14, 16 defines the general shape of the aircraft fuselage. The inner and outer frames 14, 16 may be formed of a plurality of interconnected elongate support members, which may be generally tubular or cylindrical, but the present invention is not necessarily intended to be limited in this regard. The support members may be formed of any suitable material, such as carbon fibre reinforced plastic composite or silicon carbide fibre reinforced titanium composite, but the present invention is not necessarily intended to be limited in this regard, as the material used will be largely dependent on design requirements for a particular application and the load bearing capability required, and will include consideration of parameters such as vertical and lateral shear forces, vertical and lateral bending moments and fuselage torque distribution. Furthermore, the configuration of the interconnected support members may be dependent on these and other design parameters. For example, each frame 14, 16 may be formed of a plurality of longitudinal and lateral, elongate support members having a plurality of spaced apart, substantially orthogonal struts therebetween. However, in an alternative exemplary embodiment, each frame 14, 16 may comprise a truss structure, consisting of a plurality of elongate, parallel longitudinal or lateral support members, with each pair of adjacent support members having a plurality of spaced apart truss formations therebetween, wherein each truss formation comprises a pair of elongate struts, spaced apart at a first end and coupled together at a second, opposing end to form an apex portion.

Referring specifically to FIG. 1 of the drawings, the support layer 13 further comprises a plurality of elongate orthogonal struts 18 connected between the inner and outer frames 14, 16. Once again, the struts 18 may be formed of any suitable material, such as carbon fibre reinforced plastic composite or silicon carbide fibre reinforced titanium composite, but this will again be dependent on the design parameters to be considered and the load bearing requirements specified, and the present invention is not necessarily intended to be limited in this regard. Similarly, the struts 18 may be generally cylindrical or tubular but the present invention is, once again, not necessarily intended to be limited in this regard.

In the example shown in FIG. 1 of the drawings, the struts 18 are arranged in substantially parallel, spaced apart configuration. However, referring to FIG. 2 of the drawings, in an alternative exemplary configuration described by Varvill, Richard and Bond, Alan, *The Skylon Spaceplane: Progress to Realisation*, JBIS, Vol. 61, pp. 412-418, 2008, the struts 18a may be provided in a truss arrangement, wherein a plurality of truss formations 20 is provided in spaced apart relation between the inner and outer frames 14, 16. Each truss formation 20 comprises a pair of struts 18a which are paced apart at one end and coupled together at the opposing ends to form an apex portion 26. The apex portion 26 of each truss formation 20 is connected to the outer frame 16 and the opposite ends of the truss formations are connected to the inner frame 14.

In both exemplary embodiments described above with reference to FIGS. 1 and 2 of the drawings respectively, a plurality of supporting columns 22 extend substantially orthogonally outwardly from the outer frame 16. The supporting columns 22 comprise rigid elongate cylindrical or tubular members, which may, as before, be formed of any suitable material, and may be welded or otherwise joined to the outer frame 16. An insulative layer 24, for example, titanium or other suitable heat insulative material, is provided over the outer frame 16 and the support columns 22 may extend into, or be embedded within, the insulative layer 24.

The support columns 22 are configured to support the outer skin or aeroshell 12, depending on the application to which the airframe 10 is intended, and may, for example, be formed of silicon fibre reinforced glass ceramic, but this is again highly dependent on the application and design specification, and the present invention is not necessarily intended to be limited in this regard. The outer skin or aeroshell 12 is magnetically coupled to the support layer 13 via the support columns 22. In an exemplary embodiment of the invention, such magnetic coupling is achieved by means of a set of electromagnets 28 located in or on the support columns 22, and portions of magnetically susceptible material in the form of ferromagnetic or permanently magnetic material, such as ferromagnetic sheet material inserts (not shown), embedded in or mounted on the inner surface of the outer skin or aeroshell 12. It will be appreciated that the outer skin or aeroshell 12 may also employ radar absorbent materials or a radar absorbent coating so as to achieve low observability, depending on the application to which the airframe 10 is intended. A power supply (not shown) provides a current to the electromagnets 28 to generate an attractive force in respect of the ferromagnetic inserts so as to attract and hold the outer skin or aeroshell 12 in place on the support layer 13. Whilst it is not necessarily essential to all embodiments of the present invention, the use of electromagnets 28 is considered to be beneficial, as it enables a high level of force to be achieved and the force applied can also be varied depending on the phase of flight and the aerodynamic loadings. A plurality of independently powered electrical circuits may also be provided within each electromagnet in order to provide a degree of redundancy and so achieve the required system reliability.

In some exemplary embodiments of the invention, a control circuit may be provided in respect of the power supply, to reverse the power supplied to the electromagnets 28, thereby generating repellent force in respect of the ferromagnetic sheet material inserts and pushing the outer skin or aeroshell 12 from the support layer 13. In other exemplary embodiments, the power may simply be switched off or suspended, and a force applied (if necessary) to remove the outer skin or aeroshell 12 from the support layer 13. It will be appreciated the number and specification of electromagnets 28 may vary, according to the particular design specification of the airframe 10 and the load bearing requirements thereof. However, it will be understood that a certain amount of redundancy may be built into the design, such that the outer skin or aeroshell 12 will still be adequately maintained in place on the support layer 13 in the event of a partial failure of the electrical system.

In an exemplary embodiment of the invention, the electromagnets 28 could employ superconducting windings such that the power requirements for the system can be minimised. In this case, the cooling required to achieve a superconducting state could be provided by stored liquefied hydrogen fuel or liquefied oxygen that may be carried by some air vehicles to power a rocket motor.

Thus, a significant advantage of exemplary embodiments of the invention lies in the ease with which the outer skin or aeroshell panels can be attached, and also removed to facilitate the replacement of panels in the event of damage, or if the radar absorbent coatings need to be replaced, or even to facilitate replacement of panels with updated versions, using new technologies, thereby to further increase the service life of the air vehicle. A further advantage of exemplary embodiments of the invention is that the need for any form of mechanical fastening means, to affix the outer skin/aeroshell to the support layer, is (potentially) eliminated. It will be appreciated that the need for mechanical fasteners, in itself, may pose an issue, particularly in terms of shielding the air vehicle from radar (observability) as well as potentially interfering with airflow over the air vehicle. Aspects of the invention have the potential to obviate these issues and further enable the outer skin panels to be joined in a manner that minimises observability to radar.

It will be appreciated by a person skilled in the art, from the foregoing description, that modifications and variations can be made to the described embodiments without departing from the scope of the invention as defined by the appended claims.

The invention claimed is:

1. An airframe for an air vehicle comprising an outer skin layer and a support layer defining said airframe of said air vehicle, wherein said outer skin layer is magnetically coupled during flight to said support layer;
   wherein said support layer is provided with a plurality of support columns extending outwardly from the support layer, the outer skin layer being both supported by the plurality of support columns and magnetically coupled to the support layer thereby; and
   wherein said plurality of support columns are provided with one or more electromagnets located in or on the plurality of support columns and said outer skin layer comprises a magnetically susceptible material, the outer skin layer being magnetically coupled to the support layer by the one or more electromagnets and the magnetically susceptible material.

2. The airframe according to claim 1, wherein the magnetically susceptible material is embedded in, or incorporated by, the outer skin layer.

3. The airframe according to claim 2, wherein the magnetically susceptible material comprises an array of ferromagnetic sheet material inserts embedded in or otherwise provided in or on said outer skin layer.

4. The airframe according to claim 2, wherein the magnetically susceptible material comprises magnetically susceptible particles incorporated in or on the outer skin layer.

5. The airframe according to claim 4, wherein the magnetically susceptible material comprises a distributed particulate array.

6. The airframe according to claim 2, wherein the magnetically susceptible material comprises a permanently magnetic material.

7. The airframe according to claim 1, wherein said one or more electromagnets comprise superconducting windings.

8. The airframe according to claim 1, further comprising a means for supplying power to said one or more electromagnets to generate an attracting force relative to said magnetically susceptible material so as to couple said outer skin layer to said support layer.

9. The airframe according to claim 8, further comprising a means for selectively suspending or reversing said power supplied to said one or more electromagnets so as to release said outer skin layer from said support layer.

10. The airframe according to claim 8, wherein the plurality of support columns comprise rigid elongate cylindrical or tubular members and the one or more electromagnets are contained in the support columns.

11. An air vehicle including the airframe according to claim 1.

12. A method of manufacturing an airframe for an air vehicle, the method comprising the steps of:
   providing a support layer defining said airframe of said air vehicle and including a plurality of support columns extending outwardly from the support layer;
   providing one or more electromagnets located in or on the plurality of support columns;
   providing an outer skin layer comprising a magnetically susceptible material;
   and magnetically coupling said outer skin layer to said support layer by the one or more electromagnets and the magnetically susceptible material, said magnetic coupling to be sustained during flight.

* * * * *